United States Patent [19]

Winston

[11] 4,104,987
[45] Aug. 8, 1978

[54] BIRD FEEDER

[76] Inventor: Emanuel A. Winston, 190A Skokie Valley Rd., Highland Park, Ill. 60035

[21] Appl. No.: 744,992

[22] Filed: Nov. 26, 1976

[51] Int. Cl.² ............................................. A01K 39/00
[52] U.S. Cl. ................................................ 119/51 R
[58] Field of Search ...................... 119/51 R, 52 R, 23, 119/26; D30/13, 14; 209/484

[56] References Cited

U.S. PATENT DOCUMENTS

| D. 182,449 | 4/1958 | Willard | D30/14 |
|---|---|---|---|
| 1,092,314 | 4/1914 | White | 119/51 R |
| 3,179,244 | 4/1965 | Kuhn | 119/52 R X |
| 3,453,661 | 7/1969 | Repko | 206/484 X |
| 3,913,734 | 10/1975 | Siegel | 206/484 X |
| 4,026,244 | 5/1977 | Salick | 119/51 R |

Primary Examiner—Hugh R. Chamblee
Attorney, Agent, or Firm—Stein & Frijouf

[57] ABSTRACT

A bird feeding device is disclosed for distributing bird feed comprising a first and a second member secured relative to one another. One of the first and second members includes a protruding portion forming a bird feed reservoir between the first and second members. The first member has a region in proximity to the bird feed reservoir adapted for at least partial removal from the remainder of the first member for maintaining the bird feed in the bird feed reservoir when the region is intact and for enabling access to the bird feed in the bird feed reservoir when the region is at least partially removed. The device may be constructed of a blister type plastic member in combination with a cardboard member with the bird feed contained in the bird feed reservoir making a disposable bird feeder. The foregoing abstract is merely a resume of one general application, is not a complete discussion of all principles of operation or applications, and is not to be construed as a limitation on the scope of the claimed subject matter.

14 Claims, 6 Drawing Figures

BIRD FEEDER

BACKGROUND OF THE INVENTION

1. Field of the Invention

This invention relates to animal husbandry and more particularly to feeding devices comprising hoppers and troughs.

2. Description of the Prior Art

Bird feeding devices have been known to the prior art for a great number of years. Various varieties, shapes, sizes and arrangements for distributing bird feed to birds have been developed by the prior art. These prior art bird feeding devices were made of various materials such as wood, cardboard, plastic and the like. Most of the prior art bird feeding devices were adapted to hold bird feed and to be suspended relative to a support to feed a bird. Some in the prior art have produced bird feeding devices from empty milk cartons or other boxes.

Most of the prior art bird feeding devices comprised a substantially rigid member which could be refilled with bird feed for long use and duration. These bird feeding devices were made of rugged material to withstand prolonged use but were priced acordingly higher than some consumers were willing to pay. There is a need for a disposable bird feeding device for distributing bird feed which was easy to use, inexpensive and disposable after the bird feed has been consumed.

Therefore it is an object of this invention to provide a device which overcomes the aforementioned inadequacies of the prior art devices and provides an improvement which is a significant contribution to the advancement of the pertinent art.

Another object of this invention is to provide a bird feed device for distributing bird feed comprising a first and a second member forming a bird feed reservoir therein, with the first member having a region in proximity to the bird feed reservoir adapted for at least partial removal from the remainder of the first member for maintaining the bird feed in the bird feed reservoir when the region is intact and for enabling access to the bird feed in the bird feed reservoir when the region is at least partially removed.

Another object of this invention is to provide a bird feed device for distributing bird feed including a first integral plastic member having a protruding portion cooperating with a cardboard second member forming a bird feed reservoir therebetween with the plastic member having a region being partially removable by punching out for enabling access to the bird feed.

Another object of this invention is to provide a bird feed device for distributing bird feed including perch means for receiving a bird relative to the bird feed reservoir.

Another object of this invention is to provide a bird feed device for distributing bird feed comprising a plastic blister type bird feed reservoir having an aperture therein with removable tape means secured over the aperture for maintaining the bird feed in the bird feed reservoir when the tape in intact and for enabling access to the bird feed in the bird feed reservoir when the tape is at least partially removed.

Another object of this invention is to provide a bird feed device for distributing bird feed including a first member having a protruding portion forming a bird feed reservoir with a region thereof adapted for only partial removal from the remainder of the first member establishing a tray for the bird feed.

Other objects and a fuller understanding of this invention may be had by referring to the summary of the invention, the description and the claims, taken in conjunction with the accompanying drawings.

SUMMARY OF THE INVENTION

The invention may be incorporated into a bird feeding device for distributing bird feed comprising a first and a second member secured relative to one another. One of the first and second members comprises a protruding portion forming a bird feed reservoir between the first and second members. The first member has a region in proximity to the bird feed reservoir adapted for at least partial removal from the remainder of the first member for maintaining the bird feed in the bird feed reservoir when the region is intact and for enabling access to the bird feed in the bird feed reservoir when the region is at least partially removed.

The first member may include a protruding portion with the second member comprising a substantially planar configuration. In one embodiment, the first member has a substantially planar portion with the protruding portion being integrally formed in the central area of the first member and surrounded by the planar portion. The first member may be an integral plastic member with the region of the first member being defined by a weakening in the integral plastic member to enable at least partial removal of the region from the remainder of the first member. Alternatively the first member may be provided with an aperture which is closed by removable tape secured over the aperture.

The invention may include perch receiving means in one of the first and second members adapted for securing a perch relative to the region in the first member. This means may include a substantially hollow cylindrically shaped member in the first member for receiving the perch. In another embodiment, the first and second members are adapted for receiving a perch extending through the first and second members in proximity to the region of the first member. The region in the first member may be only partially removable for establishing the region as a feeding tray for the bird feed or may be totally removable by punching the region from the first member.

In one embodiment of the instant invention the first member is a plastic member having a protruding portion integrally formed therein with the second member being secured to the first member with bird feed enclosed in the protruding portion. This embodiment may include means for securing the device relative to a support such as a tree, post of building structure. The first member may be a plastic member having a protruding portion integrally formed therein with a second member being a substantially planar cardboard member bonded to the plastic member. Another embodiment may include the first and second members being integrally formed and folded relative to one another to form the bird feed reservoir. Other variations may include a substantially cylindrical perch having an enlarged portion at one end thereof being received by an aperture in the first and second members.

This invention accordingly comprises an apparatus possessing the features, properties and the relation of elements which will be exemplified in the article hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION

Figure 1:
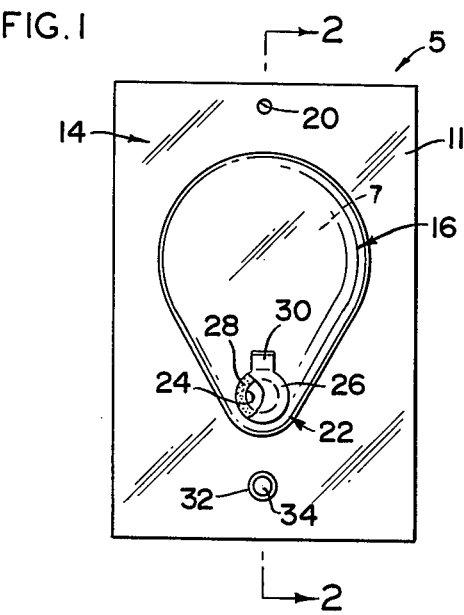
FIG. 1 is a front elevational view of a first species of a bird feeding device.
Figure 2:
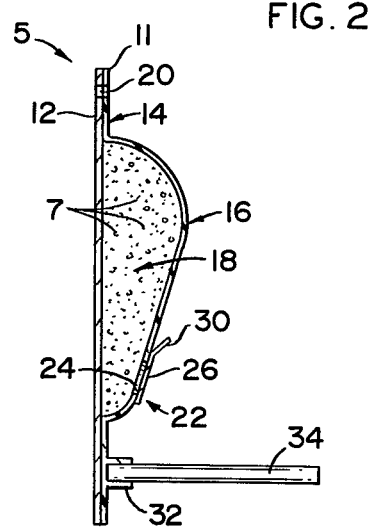
FIG. 2 is a sectional view along line 2—2 of the bird feeding device shown in FIG. 1.

FIGS. 1 and 2 illustrate a first embodiment of a bird feeding device 5 for distributing bird feed 7 comprising a first and a second member 11 and 12, respectively, secured relative to one another. The first member 11 is shown as an integral plastic member, which may be a clear plastic such as polyvinyl chloride or similar material. The first member 11 has a substantially planar portion 14 and a protruding portion 16 integrally formed in the central area of the first member 11 and substantially surrounded by the planar portion 14. The second member 12 is shown in this embodiment as a substantially planar member bonded to the first member forming a bird feed reservoir 18 between the first and the second members 11 and 12 for storing the bird feed 7. In this embodiment, the second member is shown as a substantially planar cardboard member bonded to the plastic first member 11 by suitable adhesive means as is well known in the art. The first member 11 may be fused to the second member 12 by a heat fusing process, as is also well known in the art. The device 5 includes securing means 20 shown as an aperture through the first and second members 11 and 12 for securing the device 5 to a support such as a tree or a building structure by a nail, thumbtack or other conventional means, as is well known in the art.

In the first embodiment of this invention shown in FIGS. 1 and 2, the first member 11 includes a region in proximity to the bird feed reservoir 18 which is at least partially removable from the remainder of the first member 11 and more particularly from the remainder of the protruding portion 16 for maintaining the bird feed 7 in the bird feed reservoir 18 when the region is intact and for enabling access to the bird feed 7 in the bird feed reservoir 18 when the region is at least partially removed. In this embodiment, the region 22 is more particularly shown as a through aperture 24 communicating with the bird feed reservoir 18 and covered by a cover member 26 shown as a thin film secured about aperture 24 by an adhesive 28. The cover member 26 includes a lift tab 30 which is free from adhesive and may stand upwardly from the surface of the protruding portion 16 as shown in FIG. 2.

The first member 11 in this embodiment includes a substantially hollow cylindrically shaped member 32 integrally molded in the first member 11 for frictionally receiving a perch 34 to be located in proximity to the region 22 of the device 5. The perch 34 may be made of a wooden material or a tubular or solid plastic material such as a straw or the like.

The device 5 is manufactured with the bird feed 7 included within the bird feed reservoir 18 with the cover member 26 maintaining the bird feed 7 in the bird feed reservoir 18. A consumer may secure the device 5 to a support using aperture 20 and insert the perch 34 in the hollow cylindrical member 32.

The lift tab 30 may be pulled, thereby removing the cover member 26 exposing aperture 24 enabling access to the bird feed 7 in the bird feed reservoir 18. The cover member 26 may be only partially removed in a manner similar to that shown in FIG. 6 for providing a bird feed tray for the device 5. It should be noted that the protruding portion 16 tapers into a smaller region in proximity to aperture 24 thereby enabling all of the bird feed 7 to move by action of gravity toward aperture 24 as the bird feed is consumed.

Figure 3:
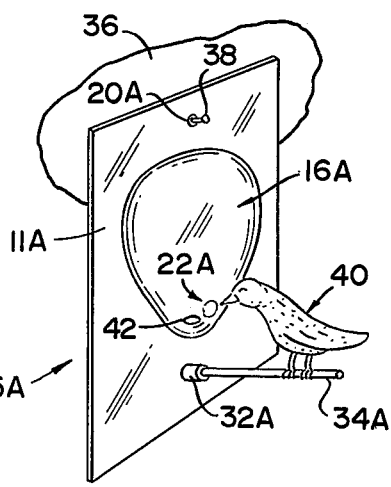
FIG. 3 is an isometric view of a variation of the invention shown in FIGS. 1 and 2.

FIG. 3 shows a modification of the invention shown in FIGS. 1 and 2 illustrating a device 5A secured to a support 36 by a nail 38 through aperture 20A. The device 5A includes a protruding portion 16A having a region 22A. A cylindrical member 32A receives a perch 34A enabling a bird 40 to rest thereon. In this embodiment, region 22A of the first member 11A is defined by a weakening in the first member 11A. The weakening may be formed by partially cutting an aperture through the first member 11 enabling the consumer to either totally or partially remove a plug member 42 from the first member 11A by punching the region 22A with a perch 34A or other convenient means. In the embodiment shown in FIG. 3, the plug 42 is completely punched and resting internal the bird feed reservoir 18, enabling access to the bird feed 7 by the bird 40.

Figure 6:
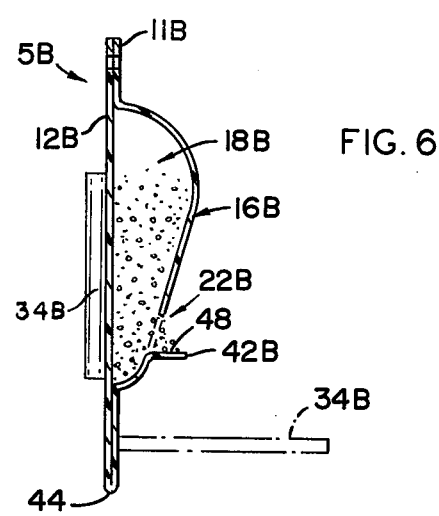
FIG. 6 is a sectional view of a bird feeding device similar to that shown in FIG. 2 which is a variation of the bird feeding devices shown in FIGS. 1–5.

FIG. 6 shows a modification of the device shown in FIGS. 1–3, more particularly shows a bird feeding device 5B having a first and a second member 11B and 12B which are shown integral with one another and folded at 44 to provide a bird feed reservoir 18B by the protruding portion 16B. The first and second members 11B and 12B may be secured to one another by heat fusing or by adhesive means as is well known in the art.

In this embodiment the region 22B includes a partially scribed area having a weakening in the integral first plastic member 11B. Accordingly, the plug area 42B may be only partially removed providing a bird feeding tray surface 48 for holding bird feed 7 relative to the phantom perch. This embodiment shows the perch 34B secured by adhesive means to the second member 12B for marketing the bird feeding device 5B. The consumer may easily remove the perch 34B and insert it on the device 5B by means (not shown) but which may include the means shown in FIGS. 2–5. The plug 42B is then partially removed, as shown in FIG. 6, to provide communication with the bird feed 7 and to establish a bird feed tray surface 48 as shown in FIG. 6.

Figure 4:
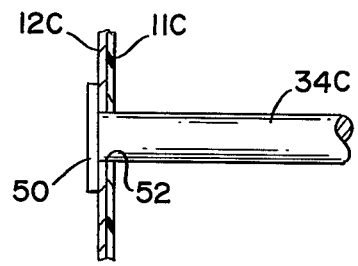
FIG. 4 is a magnified sectional view of a portion of a bird feeding device which is a modification of the invention shown in FIGS. 1–3.
Figure 5:
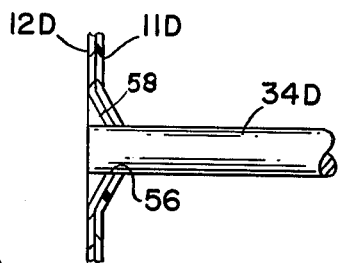
FIG. 5 is a magnified sectional view of a portion of a bird feeding device which is a modification of the invention shown in FIGS. 1–4.

FIGS. 4 and 5 show modification of means for securing the perches 34C and 34D to the first members 11C and 11D and the second members 12C and 12D, respectively. It should be understood that either of these structures may be incorporated into the device of 5, 5A and 5B. Perch 34C includes an enlarged region 50 secured adjacent the second member 12C with the remainder of the perch 34C extending through an aperture 52 in the first and second members 11C and 12C. Perch 34C is held in place by the frictional engagement with aperture 52 with the enlarged region 50 adding mechanical strength to the perch 34C.

Perch 34D in FIG. 5 extends through an aperture 56 in the first and second members 11D and 12D. The first and second members 11D and 12D protrude about aperture 56 to add mechanical strength to secure perch 34D. In this embodiment, the perch 34D is held in frictional engagement with aperture 56 in a manner similar to perch 34 being frictionally held within the hollow cylindrical member 32.

The invention has been described in a specific form in FIGS. 1–6, with various aspects of the invention being shown as specific examples. It should be understood that these specific examples may be interchanged with one another forming other combinations.

It should also be understood that that the reference to the materials used have been only by way of example and that numerous other materials and combinations thereof may be incorporated within the instant invention.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A bird feeding device for distributing bird feed, comprising in combination:
    a first and a second member secured relative to one another;
    said first member comprising a protruding portion forming a bird feed reservoir between said first and second members;
    means for securing the device to a support;
    said first member having means defining an aperture region in said bird feed reservoir adapted for at least partial removal of said means from the remainder of said first member for maintaining the bird feed in said bird feed reservoir when said region is intact and for enabling access to the bird feed in said bird feed reservoir when said region is at least partially removed;
    said aperture region being located in proximity to the lower end of said bird feed reservoir enabling substantially all of the bird feed to move by action of gravity toward said aperture region as the bird feed is consumed;
    perch receiving means removably receiving a perch to extend outwardly from said first member and in proximity to said aperture region enabling a bird to rest on the perch and to consume bird feed from said aperture region.

2. A device as set forth in claim 1, wherein said second member comprises a substantially planar configuration.

3. A device as set forth in claim 1, wherein said first member includes a substantially planar portion; and
    said protruding portion being integrally formed in the central area of said first member and surrounded by said planar portion.

4. A device as set forth in claim 1, wherein said first member is an integral plastic member; and
    said aperture region of said first member being defined in said integral plastic member by a weakening in said integral plastic member about said aperture region to enable at least partial removal of said aperture region from said first member.

5. A device as set forth in claim 1, including perch receiving means in one of said first and second members adapted for securing a perch relative to said aperture region in said first member.

6. A device as set forth in claim 1, wherein said aperture region of said first member is only partially removable for establishing said aperture region as a feeding tray for the bird feed.

7. A device as set forth in claim 1, wherein said region of said first aperture member is totally removable by punching said region from said first member.

8. A device as set forth in claim 1, wherein said perch receiving means includes a substantially hollow cylindrically shaped member extending from said first member for receiving a perch.

9. A device as set forth in claim 1, wherein said perch receiving means includes said perch extending through said first and second members in proximity to said region of said first member.

10. A device as set forth in claim 1, wherein said first member includes a plastic member having said protruding portion integrally formed therein; and
    said second member being secured to said first member with the bird feed enclosed with said bird feed reservoir.

11. A device as set forth in claim 1, wherein said first member is a plastic member having said protruding portion integrally formed therein; and
    said second member is a substantially planar cardboard member bonded to said plastic member.

12. A device as set forth in claim 1, wherein said first and second members are integral and folded relative to one another to form said bird feed reservoir.

13. A device as set forth in claim 1, wherein said perch comprises a substantially cylindrical perch having an enlarged portion at one end thereof; and
    said perch receiving means includes said first and second members having aperture means for receiving said cylindrical perch.

14. A device as set forth in claim 1, wherein said protruding portion tapers into a smaller volume in proximity to said aperture region enabling substantially all of the bird feed in said reservoir to move by action of gravity toward said aperture region as the bird feed is consumed.

* * * * *

UNITED STATES PATENT AND TRADEMARK OFFICE
CERTIFICATE OF CORRECTION

PATENT NO. : 4,104,987
DATED : August 8, 1978
INVENTOR(S) : Emanuel A. Winston

It is certified that error appears in the above—identified patent and that said Letters Patent are hereby corrected as shown below:

Column 2, line 53, delete "of" and insert --or--;

Column 4, line 35, delete "a" and insert --the--;

Column 6, line 25, after "first" delete "aperture";

Signed and Sealed this

Tenth Day of April 1979

[SEAL]

Attest:

RUTH C. MASON
Attesting Officer

DONALD W. BANNER
Commissioner of Patents and Trademarks